US008364003B2

United States Patent
Hirata

(10) Patent No.: US 8,364,003 B2
(45) Date of Patent: Jan. 29, 2013

(54) BROADCAST SIGNAL-PROVIDING DEVICE, BROADCAST SIGNAL-PROVIDING METHOD, BROADCAST SIGNAL-PROVIDING PROGRAM, AND BROADCAST SIGNAL-PROVIDING SYSTEM

(75) Inventor: Kyoji Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 1270 days.

(21) Appl. No.: 12/086,187

(22) PCT Filed: Sep. 25, 2006

(86) PCT No.: PCT/JP2006/318913
§ 371 (c)(1),
(2), (4) Date: Jun. 6, 2008

(87) PCT Pub. No.: WO2007/069379
PCT Pub. Date: Jun. 21, 2007

(65) Prior Publication Data
US 2009/0279850 A1 Nov. 12, 2009

(30) Foreign Application Priority Data
Dec. 14, 2005 (JP) .................................. 2005-360937

(51) Int. Cl.
*H04N 5/91* (2006.01)
(52) U.S. Cl. ............. 386/95; 386/46; 386/349; 386/350
(58) Field of Classification Search ............ 386/95, 386/46, 349, 350
See application file for complete search history.

(56) References Cited

U.S. PATENT DOCUMENTS

| 8,014,649 B2 * | 9/2011 | Jang ............................. 386/235 |
| 2003/0072556 A1 * | 4/2003 | Okujima et al. ................ 386/46 |
| 2003/0097659 A1 * | 5/2003 | Goldman ....................... 725/89 |
| 2007/0047903 A1 * | 3/2007 | Kim .............................. 386/68 |
| 2009/0103892 A1 * | 4/2009 | Hirayama et al. ............. 386/83 |
| 2009/0142033 A1 * | 6/2009 | Schmouker et al. ........... 386/68 |

FOREIGN PATENT DOCUMENTS

| JP | 2003-047031 A | 2/2003 |
| JP | 2004-072617 A | 3/2004 |
| JP | 2004-328414 A | 11/2004 |
| JP | 2005-117149 A | 4/2005 |
| JP | 2005-223778 A | 8/2005 |
| JP | 2005-236913 A | 9/2005 |
| JP | 2005-244473 A | 9/2005 |
| JP | 2005-263913 A | 9/2005 |
| JP | 2006-237955 A | 9/2006 |

\* cited by examiner

*Primary Examiner* — Jeffrey Pwu
*Assistant Examiner* — Samuel Ambaye
(74) *Attorney, Agent, or Firm* — Foley & Lardner LLP

(57) ABSTRACT

During time-shifted playback of a broadcast signal, an immediacy information detection means (121) detects whether the received broadcast signal is a broadcast signal having immediacy information that must be provided immediately to the viewer, and when a broadcast signal having immediacy information is detected, a playback control means (123) interrupts the time-shifted playback of the broadcast signal that does not have immediacy information to immediately play back the broadcast signal having immediacy information.

20 Claims, 12 Drawing Sheets ered in the order
BROADCAST SIGNAL-PROVIDING DEVICE, BROADCAST SIGNAL-PROVIDING METHOD, BROADCAST SIGNAL-PROVIDING PROGRAM, AND BROADCAST SIGNAL-PROVIDING SYSTEM This application is the National Phase of PCT/JP2006/318913 filed Sep. 25, 2006 which claims priority to Japanese Application No. 2005-360937 filed Dec. 14, 2005, the disclosures of which are hereby incorporated by refence in their entirety.

TECHNICAL FIELD

The present invention relates to a broadcast signal-providing device, a broadcast signal-providing method, a broadcast signal-providing program, and a broadcast signal-providing system capable of the time-shifted provision of a broadcast signal such as for television or radio.

BACKGROUND ART

A playback mode for going back a prescribed time interval to play back recorded data of, for example, a television program while recording the program on a recording medium is widely used as a time-shifted playback mode. Time-shifted playback is a mode of playback that starts playback of an already recorded program from the start of the program and uses double-speed reproduction with sound to chase the real-time broadcast, and is therefore also referred to as "chase playback." In time-shifted playback, the user can, while recording a received broadcast signal onto a recording medium, play back and view at the user's desired speed (for example, fast-forward or slow-motion playback) or, as necessary, repeat playback and viewing of specific points. As a result, this mode provides a viewing environment that affords the user a great degree of freedom.

As a broadcast signal-providing device of the related art, a method has been considered for, upon the detection of an incoming call in a mobile telephone when a television function is in operation, implementing a process for starting a recording operation and holding the recording starting point and then starting a playback operation from the recording starting point upon termination of the conversation on the mobile telephone (for example, JP-A-2005-223778). In this configuration, when television viewing is interrupted by an incoming telephone call or the arrival of a guest, the user can still return to the point of interruption and view the missed program.

In addition, a method has been considered in which, in a portable telephone having a television reception function, a control unit executes a process for storing the received broadcast signal in a storage means upon input of a signal of the start of a conversation and executes a process for playing back the broadcast signal that was stored in the storage means upon input of a signal indicating the end of the conversation (for example, JP-A-2005-117149). In this type of configuration, even when there is an incoming call from the telephone of an acquaintance, when the user is viewing a television program on a portable telephone, the user can resume viewing of the stored television program once the conversation (communication) with the acquaintance ends.

As described above, the broadcast signal-providing device of the related art is of a configuration provided with a playback means and recording means for starting recording of a television program by the recoding means upon the occurrence of an event that interrupts television viewing such as the start of a conversation and such as playing back the recorded data by the playback means from the point of interruption when the event ends. By means of this configuration, viewing can be easily resumed by returning to the point of interruption. However, a broadcast signal-providing means of this type has several problems as described below.

First, in the device of the related art, the broadcast signal is merely recorded on the recording medium in the order recorded and the information (content) then played back with a time shift in the order received, and even when traffic congestion information, weather information, or event information for which there is a need for immediacy (information that should be viewed immediately) is included in the broadcast signal, this information is similarly time-shifted. The problem therefore arises that the viewer is unable to immediately view information demanding immediate attention. In particular, when the viewer replays content or temporarily halts playback and thereby increases the time shift of the time difference between the time of recording and the time of playback, the viewing of information such as weather information that is immediately required is delayed and the possibility arises that the viewer will mistakenly apply the information.

The second problem is that when information that calls for immediacy is viewed with a time shift, changes in conditions that have occurred during the interval of time shift are not reflected. The problem therefore arises that the viewer is provided with information that does not correspond to changes in conditions. For example, when event information having the content that "tickets are still available" is broadcast on television, the viewer, upon viewing this event information with a time shift may be caused to mistakenly believe that tickets are available even though tickets have already been sold out at the time the viewer views the information.

The third problem is that information having a high degree of immediacy (for example, information regarding a typhoon, earthquake, or other event) is often inserted as a flash report into the content of regular broadcasts (during a regular television program), and the insertion of this information into a regular broadcast interferes with the ambience of the content of the regular broadcast. Even though information having a high degree of immediacy is information that must be provided to the viewer immediately and must therefore be inserted into a regular broadcast, the interference with the ambiance of a program resulting from viewing information that has already lost newness when viewing content that has undergone a time shift is an inconvenience for the viewer.

DISCLOSURE OF THE INVENTION

The present invention was achieved to solve the above-described problems and has as an object the provision of a broadcast signal-providing device, broadcast signal-providing method, broadcast signal-providing program, and broadcast signal-providing system that, in the event of the broadcast of information requiring a high degree of immediacy when time-shifted content is being viewed, can provide the viewer with the information without loss of the newness of information that calls for immediacy. It is another object of the present invention to provide a broadcast signal-providing device, broadcast signal-providing method, broadcast signal-providing program, and broadcast signal-providing system that, when time-shifted content is being viewed, can prevent information having immediacy from interfering with the ambiance of content.

To achieve the above-described objects, the broadcast signal-providing device according to the present invention is provided with: reception means for receiving a broadcast signal, recording control means for recording the broadcast signal that has been received by the reception means to a storage unit, and playback control means for implementing time-shifted playback of the broadcast signal that has been recorded in the storage unit; wherein the broadcast signal-providing device is provided with an immediacy information detection means for detecting during time-shifted playback of a broadcast signal whether a received broadcast signal is a broadcast signal having immediacy information that must be provided immediately to the viewer; and when a broadcast signal of immediacy information is detected by the immediacy information detection means, the playback control means provides the broadcast signal of immediacy information with priority over a broadcast signal that is not immediacy information.

The playback control means may be of a configuration by which, when a broadcast signal having immediacy information is detected by the immediacy information detection means, the playback control means interrupts time-shifted playback and stores interruption position information indicating the interruption position in an interruption position information memory means, and when a broadcast signal having immediacy information is not detected by the immediacy information detection means, resumes time-shifted playback from the interruption position indicated by the interruption position information.

The recording control means may be of a configuration whereby, when a broadcast signal having immediacy information is detected by the immediacy information detection means, the recording control means records the broadcast signal having immediacy information in the storage unit separate from a broadcast signal that does not have immediacy information; and
the playback control means, upon the resumption of time-shifted playback, executes time-shifted playback of a broadcast signal that does not have immediacy information that is recorded in the storage unit separate from a broadcast signal having immediacy information.

The broadcast signal-providing device may be provided with an interruption position determination means for, when a broadcast signal having immediacy information is detected by the immediacy information detection means, detecting a point of change of the broadcast signal that is being played back and determining the detected point of change as the interruption position of playback.

The broadcast signal-providing device may be provided with an immediacy level detection means for, when a broadcast signal having immediacy information is detected by the immediacy information detection means, detecting the level of immediacy in the immediacy information, wherein the interruption position determination means detects a point of change of a broadcast signal according to the level that is detected by the immediacy level detection means and determines the detected point of change as the interruption position of playback.

The interruption position determination means may be of a configuration for detecting a point of change based on the value of differences in characteristic amounts between frames that make up a broadcast signal.

The immediacy information detection means may be of a configuration for using meta information contained in a broadcast signal to detect immediacy information.

The immediacy information detection means may be of a configuration for detecting immediacy information by image analysis or sound analysis of a broadcast signal.

The broadcast signal-providing method according to the present invention is a method of recording a broadcast signal received by means of a reception means to a storage unit and executing time-shifted playback of the broadcast signal recorded in the storage unit, whereby a control unit, in accordance with a control program stored in a memory unit, detects whether a received broadcast signal during time-shifted playback of a broadcast signal is a broadcast signal having immediacy information that must be provided to the viewer immediately, and upon detecting a broadcast signal having immediacy information, provides the broadcast signal having immediacy information with priority over a broadcast signal that does not have immediacy information.

The broadcast signal-providing method may be of a configuration whereby, when a broadcast signal having immediacy information is detected, time-shifted playback is interrupted, and interruption position information that indicates the interruption position is stored in an interruption position memory means, and when a broadcast signal having immediacy information is not detected, time-shifted playback is resumed from the interruption position indicated by the interruption position information.

The broadcast signal-providing method may be of a configuration whereby, when a broadcast signal having immediacy information is detected, the broadcast signal having immediacy information is recorded in the storage unit separate from the broadcast signal that does not have immediacy information, and when time-shifted playback is resumed, the broadcast signal that does not have immediacy information and that is recorded in the storage unit separate from the broadcast signal having immediacy information is played back with a time-shift.

The broadcast signal-providing method may be of a configuration whereby, when a broadcast signal having immediacy information is detected, a point of change of the broadcast signal that is being played back is detected, and the detected point of change is determined as the interruption position of playback.

A configuration is also possible whereby, when a broadcast signal having immediacy information is detected, the level of immediacy in the immediacy information is detected, the point of change of the broadcast signal is detected according to the detected level, and the detected point of change is determined as the interruption position of playback.

The broadcast signal-providing method may be of a configuration whereby a point of change is detected based on values of the differences of characteristic amounts between frames that make up the broadcast signal.

The broadcast signal-providing program according to the present invention is a broadcast signal-providing program for causing a computer to execute time-shifted playback of a broadcast signal, this broadcast signal-providing program causing a computer to execute: an immediacy information detection process of detecting whether a broadcast signal received during time-shifted playback of a broadcast signal is a broadcast signal having immediacy information that must be provided to the viewer immediately, and, when a broadcast signal having immediacy information has been detected by the immediacy information detection process, a playback control process of providing the broadcast signal having immediacy information that will have priority over a broadcast signal that does not have immediacy information.

The broadcast signal-providing program may be of a configuration for, in the playback control process, causing the interruption of time-shifted playback and the storage interruption position information indicating the interruption position in an interruption position information memory means when a broadcast signal having immediacy information is detected in the immediacy information detection process, and for causing resumption of time-shifted playback from the interruption position indicated by the interruption position information when a broadcast signal of immediacy information is not detected in the immediacy information detection process.

The broadcast signal-providing system according to the present invention is a broadcast signal-providing system provided with a broadcast signal transmitter for transmitting a broadcast signal and a broadcast signal-providing device for receiving the broadcast signal transmitted from the broadcast signal transmitter to provide to a viewer, wherein the broadcast signal transmitter transmits a broadcast signal that includes information indicating attributes of the broadcast signal, and the broadcast signal-providing device includes: a reception means for receiving a broadcast signal; a recording control means for recording to a storage unit a broadcast signal received by the reception means; an immediacy information detection means for detecting, based on the information indicating attributes of the broadcast signal, whether the broadcast signal received during time-shifted playback of a broadcast signal is a broadcast signal having immediacy information that must be provided to the viewer immediately; and a playback control means for both executing time-shifted playback of a broadcast signal that has been recorded in the storage unit and, when a broadcast signal having immediacy information has been detected by the immediacy information detection means, providing the broadcast signal having immediacy information that will have priority over a broadcast signal that does not have immediacy information.

As described hereinabove, the broadcast signal-providing device according to the present invention is of a configuration whereby a broadcast signal having immediacy information is provided that will have priority over a broadcast signal that does not have immediacy information when a broadcast signal having immediacy information is detected by the immediacy information detection means, whereby immediacy information can be provided immediately to the viewer without a loss of newness of the immediacy information.

In addition, the broadcast signal-providing device is of a configuration for, when a broadcast signal having immediacy information is detected, interrupting time-shifted playback and recording interruption position information that indicates the interruption position in an interruption position storage means, and when a broadcast signal having immediacy information is not detected, for resuming the time-shifted playback from the interruption position indicated by the interruption position information, whereby immediacy information can be provided to the viewer immediately without loss of the newness of the immediacy information, and further, the occurrence of a delayed response or confusion on the part of the viewer that arise from the time-shifted playback of immediacy information can be prevented.

In addition, the broadcast signal-providing device is of a configuration by which, when a broadcast signal having immediacy information is detected, the broadcast signal having immediacy information is recorded in a storage unit separate from the broadcast signal that does not have immediacy information, and upon resumption of the time-shifted playback, time-shifted playback is executed for the broadcast signal that does not have immediacy information and that is recorded in the storage unit separate from the broadcast signal having immediacy information, whereby the duplicate playback of immediacy information can be avoided and interference with the ambiance of playback can be prevented.

In addition, the broadcast signal-providing device is of a configuration for, when a broadcast signal having immediacy information has been detected, detecting a point of change of the broadcast signal during playback and determining the detected point of change as an interruption position, whereby the sudden playback of immediacy information at, for example, a climax scene and the consequent interference of the ambiance of playback can be reliably prevented.

In addition, the broadcast signal-providing device is of a configuration for, when a broadcast signal having immediacy information has been detected, detecting the level of immediacy in the immediacy information, detecting a point of change of the broadcast signal according to the detected levels, and determining the detected point of change as the interruption position of playback, thereby enabling the provision of immediacy information to the viewer without loss of the newness of the immediacy information while at the same time preventing interference of the viewing ambiance for the viewer.

BEST MODE FOR CARRYING OUT THE INVENTION

Figure 1:
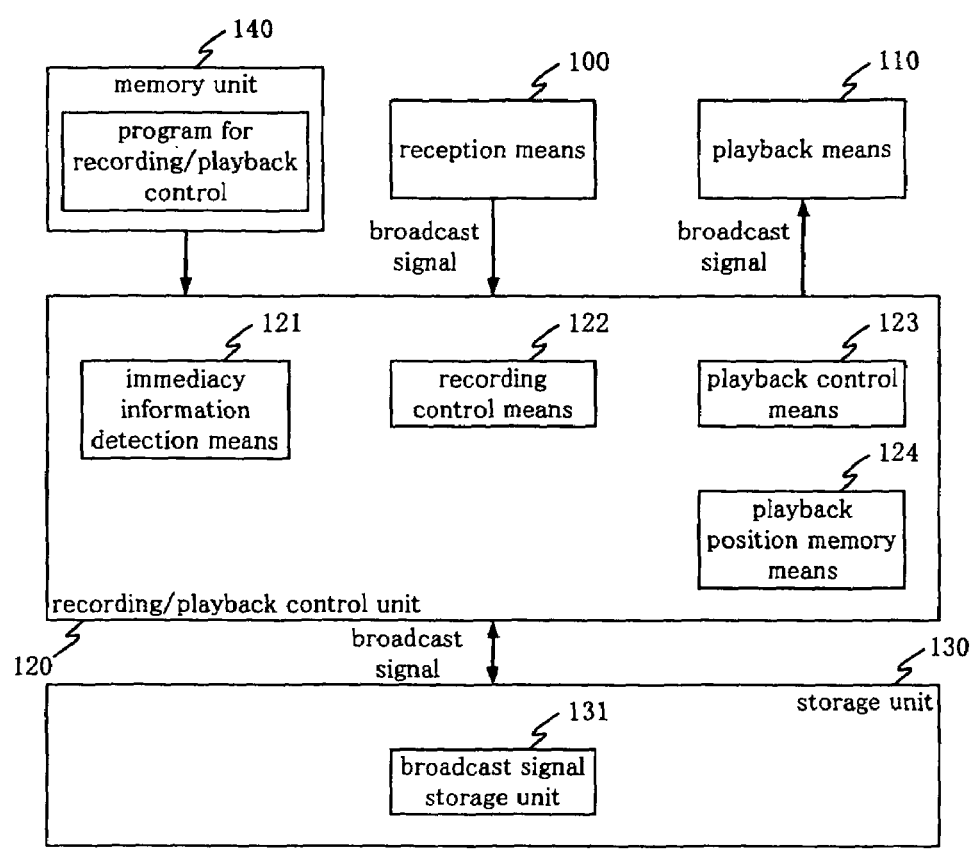
FIG. 1 is a block diagram showing the configuration of a broadcast signal-providing device of the first embodiment.

Explanation next regards embodiments of the present invention with reference to the accompanying figures.
First Embodiment FIG. 1 is a block diagram showing the configuration of the broadcast signal-providing device of the first embodiment. The broadcast signal-providing device is a device for providing a viewer with a broadcast signal such as of images or sound. As shown in FIG. 1, the broadcast signal-providing device is provided with: reception means 100, playback means 110, recording/playback control unit 120, storage unit 130, and memory unit 140. In addition, the broadcast signal-providing device may be a personal computer incorporated in a television or television tuner, a device incorporated in a radio, or a device separate from a television, personal computer, or radio.

In the configuration shown in FIG. 1, reception means 100 receives a signal transmitted by radio or cable from a broadcast station (a television station or radio station). For example, in the case of digital television broadcasting of ground waves, reception means 100 includes an antenna, reception circuit, and decoder, whereby packets are extracted by subjecting a broadcast electromagnetic wave received by the antenna to tuning/demodulation/error correction in the reception circuit and the extracted packets are then decoded to audio data and video data by the decoder. In this embodiment, audio data (the audio signal) and video data (the video signal) are referred to as the broadcast signal. The broadcast signal is only audio data in the case of radio broadcast and is audio data and video data in the case of a television broadcast. The broadcast signal is not limited to audio data and video data, and can include media data corresponding to other broadcast forms (for example, data corresponding to teletext broadcasting of cable television).

Playback means 110 plays back the broadcast signal that has been received by reception means 100. In this embodiment, "playback" includes "display" of video data and "audio output" of audio data. In addition, "playback" includes either real-time playback for playing back a received broadcast signal in real time (immediately, simultaneously) or time-shifted playback for first recording a received broadcast signal and then playing back the recorded broadcast signal after a prescribed time interval. Specific examples that can be offered of playback means 110 include a display panel (for example, the monitor of a television, or the display of a personal computer) for displaying video data and speakers for the audio output of audio data. In the case of television broadcast, a display panel and speakers must be provided as playback means 110, but in the case of radio broadcast, only speakers need be provided as playback means 110. Playback means 110 may also take the form of other devices for providing media data corresponding to other broadcast forms.

Recording/playback control unit 120 executes control for recording (storing) a broadcast signal received by reception means 100 in storage unit 130, and control for playing back the broadcast signal received by reception means 100 on playback means 110. In the playback of a broadcast signal, recording/playback control unit 120 further, in addition to the control for real-time playback of the received broadcast signal, implements control for recording a received broadcast signal in storage unit 130 and for executing time-shifted playback of the broadcast signal that has been recorded in storage unit 130. As time-shifted playback, special forms of playback such as halted (paused) playback, slow-motion playback, repeated playback, and high-speed playback are supported. As shown in FIG. 1, recording/playback control unit 120 includes immediacy information detection means 121, recording control means 122, playback control means 123, and playback position memory means 124.

In recording/playback control unit 120, immediacy information detection means 121 detects from the broadcast signal that has been received by reception means 100 intervals in which information calling for immediacy (hereinbelow referred to as "immediacy information") has been inserted. In other words, the starting times and ending times of immediacy information are detected from the broadcast signal. For example, in the case of immediacy information in which the audio data (sound signal) has a distinguishing feature such as a time signal, an interval of immediacy information is detected by rating the degree of similarity between the received audio data and audio data that have been set in advance. If the immediacy information is a weather report or a traffic congestion report, an interval (starting time) of the immediacy information is detected by implementing speech recognition to detect the occurrence of the particular words "And now for the weather" or "traffic conditions." Alternatively, a configuration is also possible for detecting an interval of immediacy information by using image analysis to recognize a particular object such as a weather map or a newscaster. A further configuration is possible in which an interval of immediacy information is detected using data information that is superposed and transmitted on a broadcast signal (such as character data information in a teletext broadcast).

Recording control means 122 implements control for, when the broadcast signal received by reception means 100 is not an immediacy information interval, recording (storing) this broadcast signal in broadcast signal storage unit 131 of storage unit 130. In this embodiment, recording control means 122 interrupts the recording of the broadcast signal to broadcast signal storage unit 131 of storage unit 130 when the received broadcast signal is immediacy information, i.e., when an interval of immediacy information is detected by immediacy information detection means 121.

When an interval of immediacy information is not detected by immediacy information detection means 121, playback control means 123 executes control for reading the broadcast signal that is stored in broadcast signal storage unit 131 of storage unit 130 and for supplying the read broadcast signal to playback means 110 to execute time-shifted playback. When the starting time of immediacy information is detected by immediacy information detection means 121, playback control means 123 further interrupts the control of time-shifted playback of the broadcast signal read from broadcast signal storage unit 131 and executes control for storing in playback position memory means 124 interruption position information that indicates the position at which time-shifted playback was interrupted. Playback control means 123 then executes control for supplying the immediacy information received by reception means 100 (information in the interval of immediacy information of the broadcast signal) to playback means 110 for real-time playback. When the end time of immediacy information is detected by immediacy information detection means 121, playback control means 123 further executes control for referring to the interruption position information stored in playback position memory means 124, reading the broadcast signal from the playback interruption position from broadcast signal storage unit 131, and supplying the broadcast signal that has been read to playback means 110 to resume time-shifted playback. In addition, as described hereinabove, playback control means 123 also executes control for special playback as time-shifted playback such as halting (pausing) of playback, slow-motion playback, repeated playback, high-speed playback.

Playback position memory means 124 is a memory medium for, when time-shifted playback is interrupted in accordance with the detection of the starting time of immediacy information by immediacy information detection means 121, storing interruption position information that indicates the position at which time-shifted playback is interrupted. For example, playback position memory means 124 is constructed as a memory medium such as flash memory.

Recording/playback control unit 120 is made up by an arithmetic unit (control device) such as a CPU and controls the operations of the various means in accordance with a program for recording/playback control stored in memory unit 140. Recording/playback control unit 120A (FIG. 4) and recording/playback control unit 120B (FIG. 8) that will be described hereinbelow are similar. In addition, memory unit 140 may be incorporated in recording/playback control unit 120 or may be the same memory medium as storage unit 130.

Storage unit 130 is a memory medium that contains broadcast signal storage unit 131 for storing (recording) the broadcast signal that is the content information that is to be subjected to time-shifted playback. Storage unit 130 may be composed of a memory medium such as a hard disk, flash memory, DVD, or CD. Storage unit 130 is not necessarily composed of a single memory medium, and may also be a combination of a CD, hard disk, flash memory, and DVD. In addition, storage unit 130 need not be a storage device for the exclusive use of the broadcast signal-providing device and may be a storage device that also serves as a video storage device for other playback or as the storage device of other private content.

Although not shown in FIG. 1, the broadcast signal-providing device may also be provided with a signal input unit for applying operation signals as input according to the operation of a console by the viewer (button operation or operation by remote control). The viewer operates the console when terminating viewing, halting playback, or executing operations such as slow-motion playback, fast-forward playback (high-speed playback). Playback control means 123 executes control such as for terminating viewing and halting playback in accordance with the input of operation signals from the signal input unit.

Figure 2:
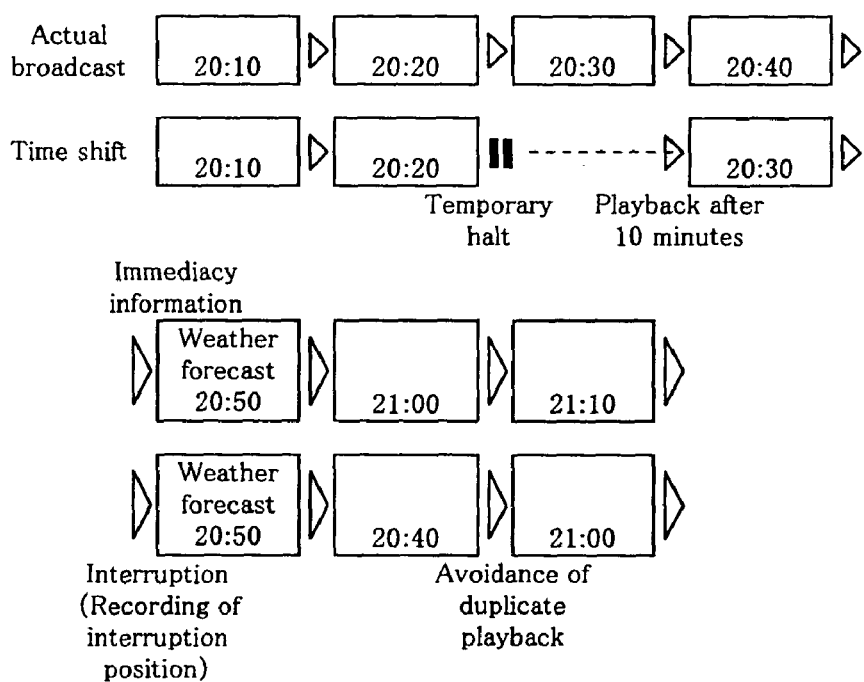
FIG. 2 is a timing chart showing an interval of playback of immediacy information of the first embodiment.
Figure 3:
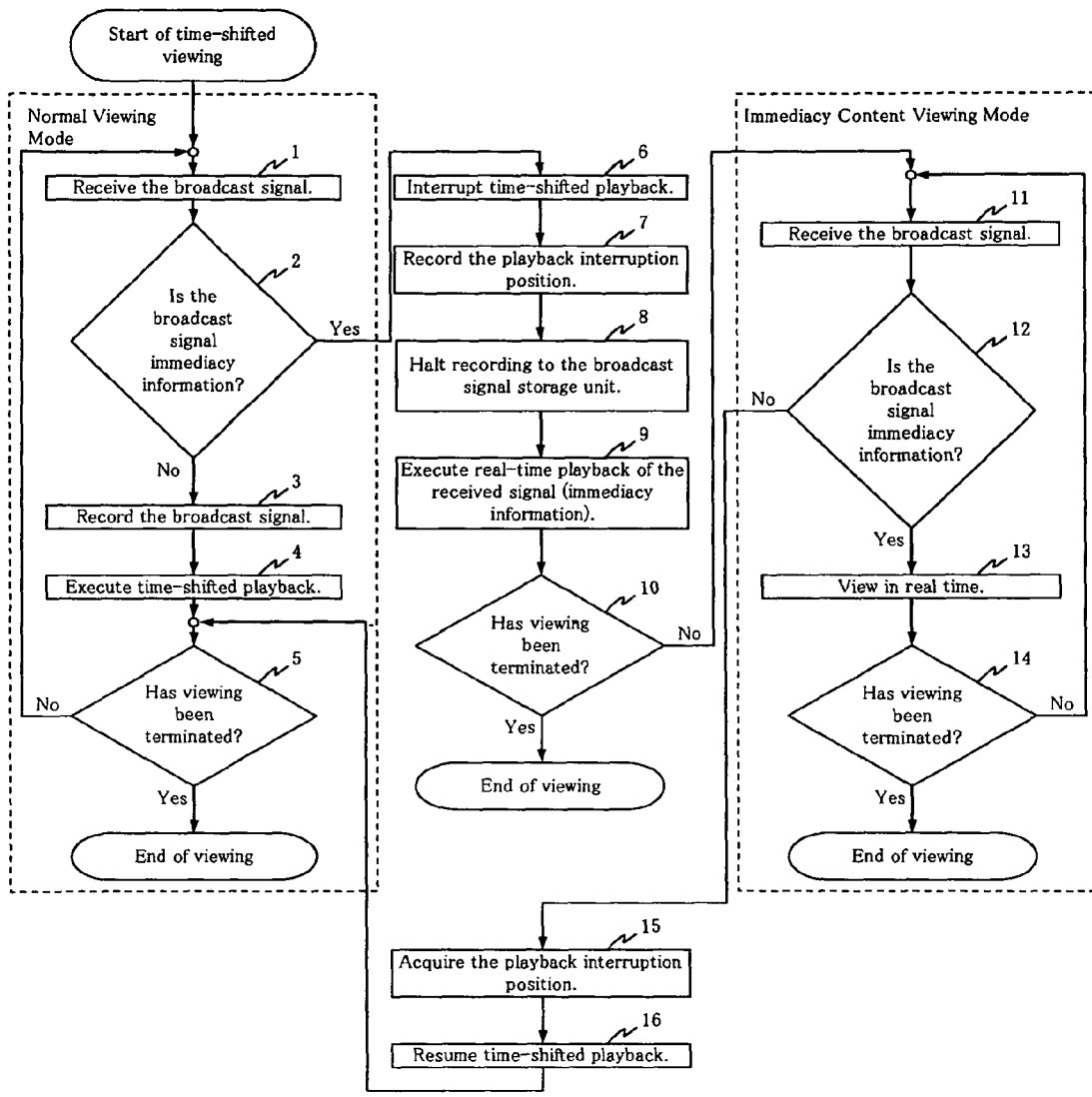
FIG. 3 is a flow chart for explaining the operation of the broadcast signal-providing device of the first embodiment.

Explanation next regards the operations of the broadcast signal-providing device in the first embodiment with reference to FIGS. 2 and 3.

FIG. 2 is a timing chart showing an interval of playback of immediacy information of the first embodiment. FIG. 3 is a flow chart for explaining the operations of the broadcast signal-providing device of the first embodiment.

As shown in FIG. 2, it is assumed that the viewer starts viewing a television broadcast from 20:10 (8:10 pm). It is assumed that, at this time, the viewer starts viewing in normal viewing mode (normal time-shift viewing mode). As shown in FIG. 2, the playback time of the content (broadcast signal) that the viewer is watching matches the actual time of the television broadcast.

At this time, as shown in FIG. 3, when reception means 100 is receiving the broadcast signal in Step 1, immediacy information detection means 121 constantly seeks in Step 2 intervals (starting times) of immediacy information from the broadcast signal received by reception means 100. When an interval of immediacy information is not detected by immediacy information detection means 121, recording control means 122 executes control for recording the received broadcast signal in broadcast signal storage unit 131 in Step 3. In addition, playback control means 123 reads the broadcast signal from broadcast signal storage unit 131 and executes time-shifted playback by supplying playback means 110 with the read broadcast signal in Step 4. The process of the above-described Steps 1-4 is continuously executed as long as a view termination signal does not arrive from the viewer in Step 5.

As shown in FIG. 2, when the viewer carries out an operation for temporarily halting playback at 20:30, playback control means 123 executes control for temporarily halting the playback of the broadcast signal in Step 4. At this time, control is being executed for the reception of the broadcast signal by reception means 100 in Step 1 and the recording of the broadcast signal by recording control means 122 in Step 3. When the viewer resumes playback at 20:40 (ten minutes later) (when the temporary halt is ended), playback control means 123 again reads the broadcast signal from broadcast signal storage unit 131 and resumes playback by supplying playback means 110 with the broadcast signal that has been read in Step 4. In this way, the ten-minute halt of playback causes a ten-minute shift between the time of the actual television broadcast and the time of playback of the content that the viewer is watching.

When a "weather report," which is immediacy information, is broadcast at 20:50, immediacy information detection means 121 detects the starting time of the immediacy information at "Yes" in Step 2, whereby playback control means 123 executes control to interrupt the time-shifted playback in Step 6 and store the interruption position information of playback in playback position memory means 124 in Step 7. Recording control means 122 further halts the control of recording the received broadcast signal in broadcast signal storage unit 131 in Step 8. Playback control means 123 then begins control for real-time playback of the broadcast signal by supplying playback means 110 with the broadcast signal that is currently being received (the immediacy information) in Step 9. Thus, upon the start of real-time playback, the time of playback of the content that the viewer is watching matches the time of the actual television broadcast.

The viewing mode in Steps 11-14 transitions from the normal viewing mode to immediacy content viewing mode unless a signal of termination of viewing is received from the viewer in Step 10.

Even in the immediacy content viewing mode, reception means 100 receives the broadcast signal in Step 11. Immediacy information detection means 121 constantly seeks the interval (ending time) of the immediacy information from the broadcast signal received by reception means 100 in Step 12. When the interval of immediacy information is detected by immediacy information detection means 121, playback control means 123 executes real-time playback by supplying playback means 110 with the broadcast signal received by reception means 100 in Step 13. The above-described processes of Steps 11-13 are repeatedly executed until a viewing termination signal comes from the viewer in Step 14.

As shown in FIG. 2, it is assumed that the "weather report," which is the immediacy information, ends at 21:00. In this case, immediacy information detection means 121 detects the ending time of the immediacy information in "No" of Step 12., whereby playback control means 123 reads and acquires the interruption position information stored in playback position memory means 124 in Step 15. Playback control means 123 then refers to the interruption position information that have been acquired, reads from broadcast signal storage unit 131 the broadcast signal from the playback interruption position, and supplies playback means 110 with the broadcast signal that has been read in Step 16 to resume the time-shifted playback. The viewing mode subsequently shifts from immediacy content viewing mode to normal viewing mode, and the processes of Steps 1-5 are again repeatedly executed. Control may be implemented for carrying out the processes of Steps 15 and 16 and transitioning to the normal viewing mode not only when immediacy information detection means 121 detects the ending time of immediacy information in Step 12, but also when the viewer carries out an operation for switching from the immediacy content viewing mode to the normal viewing mode.

Upon transitioning to the normal viewing mode, execution is resumed for the reception of the broadcast signal in Step 1, detection of immediacy information in Step 2, recording of the broadcast signal in Step 3, and time-shifted playback in Step 4, as previously described. Here, time-shifted playback is executed by reading the broadcast signal that is recorded in broadcast signal storage unit 131 and supplying it to playback means 110, but the broadcast signal (immediacy information)

in the interval of immediacy information (the execution interval of immediacy content viewing mode) is not recorded in broadcast signal storage unit 131 as in Step 8. Accordingly, the broadcast signal from 20:40 to 20:50 is subjected to time-shifted playback as shown in FIG. 2, but when the broadcast signal has been played back until 20:50, the playback jumps (skips) as far as the broadcast signal of 21:00. In this way, the interval of the immediacy information is skipped to avoid duplicate playback of immediacy information.

According to the first embodiment as described hereinabove, a configuration is adopted whereby, upon detecting immediacy information (information that should be played back in real time), the broadcast signal that is being played back in time-shifted viewing is interrupted and the immediacy information is played back in real time, whereby the immediacy information can be provided to the viewer without any loss of the newness of content having a high level of immediacy. As a result, the delayed response of the viewer or mistaken interpretation of content by the viewer resulting from the time shift of content can be prevented.

According to the first embodiment, a configuration is adopted whereby the duplicate playback of immediacy information that has been played back once can be avoided in the relevant portion in a program, whereby a viewing environment can be provided in which the ambiance of the program is undisturbed.

In the above-described first embodiment, recording control means 122 is of a configuration for halting the recording of the broadcast signal to broadcast signal storage unit 131 when immediacy information has been detected by immediacy information detection means 121, but a configuration is also possible in which the broadcast signal is recorded in broadcast signal storage unit 131 even when immediacy information has been detected. Although such a configuration cannot achieve a configuration for avoiding the duplicate playback of immediacy information, the effect of enabling the provision of immediacy information to the viewer without any loss of the newness of content having high immediacy can still be achieved. In some cases, a viewer may wish to see (or hear) content that is provided together with the immediacy information (for example, content that is provided when, as immediacy information, the flash report of an event is presented as a streaming subtitle). Accordingly, a configuration is possible in which the broadcast signal is recorded to broadcast signal storage unit 131 even in the interval of immediacy information such that the viewer can again view (hear) the content of the interval of the immediacy information.

Second Embodiment

In the first embodiment, a configuration was adopted in which the normal viewing mode switched to the immediacy content viewing mode to realize real-time playback at the time point of detection of immediacy information. In contrast, in the second embodiment, a configuration is adopted in which, instead of switching the viewing mode immediately upon detection of the immediacy information, the viewing mode is switched at a more appropriate timing.

Figure 4:
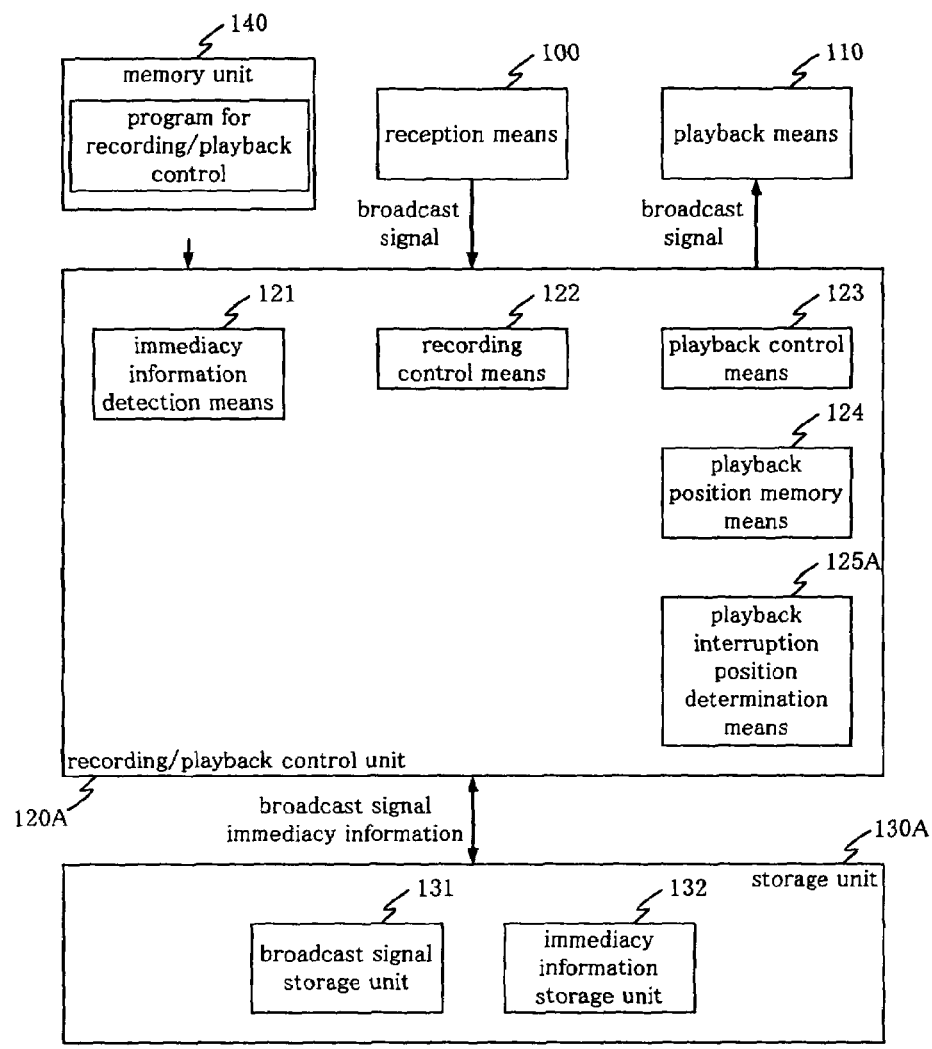
FIG. 4 is a block diagram showing the configuration of the broadcast signal-providing device of the second embodiment.

FIG. 4 is a block diagram showing the configuration of the broadcast signal-providing device of the second embodiment. In the configuration shown in FIG. 4, in contrast to the configuration shown in FIG. 1, playback interruption position determination means 125A is provided in recording/playback control unit 120A and immediacy information storage unit 132 is provided storage unit 130A.

When the interval of immediacy information has been detected by immediacy information detection means 121, playback interruption position determination means 125A determines an interruption position of playback that is suitable for inserting the interval of immediacy information (an interruption position of playback that is suitable for switching from the normal viewing mode to the immediacy content viewing mode) by analyzing the broadcast signal that is recorded in broadcast signal storage unit 131 and that is to be played back from this point (video data or sound data (audio data) or both video data and sound data). Playback interruption position determination means 125A then stores in playback position memory means 124 the interruption position information indicating the playback interruption position that has been determined.

Immediacy information storage unit 132 is a memory medium for storing (accumulating) the broadcast signal in intervals of immediacy information when an interval of immediacy information has been detected by immediacy information detection means 121. In storage unit 130, a single memory medium may be divided into the storage area of broadcast signal storage unit 131 and the storage area of immediacy information storage unit 132, or broadcast signal storage unit 131 and immediacy information storage unit 132 may be composed of separate memory media.

Recording control means 122 in the second embodiment differs from recording control means 122 in the first embodiment and carries out the following operations. When an interval of immediacy information is not detected by immediacy information detection means 121, recording control means 122 records the received broadcast signal in broadcast signal storage unit 131 of storage unit 130. When an interval of immediacy information is detected by immediacy information detection means 121, recording control means 122 executes control for recording the broadcast signal, which is the received immediacy information, in immediacy information storage unit 132 of storage unit 130.

Playback control means 123 in the second embodiment differs from playback control means 123 in the first embodiment and carries out the following operations. Even when a starting time of immediacy information has been detected by immediacy information detection means 121, playback control means 123 does not immediately carry out real-time playback of the immediacy information, but rather, continues to execute time-shifted playback of the broadcast signal (content) that the viewer is watching and that does not have immediacy information until the interruption position (point) of playback determined by playback interruption position determination means 125A is reached. In other words, playback control means 123 reads the broadcast signal that does not have immediacy information from broadcast signal storage unit 131 and supplies the read broadcast signal to playback means 110 to continue the time-shifted playback. When playback of the broadcast signal continues and arrives at the interruption position, playback control means 123 interrupts the time-shifted playback of the broadcast signal that does not have the immediacy information. Playback control means 123 then reads the broadcast signal (content) having the immediacy information that has been newly recorded in immediacy information storage unit 132 and supplies playback means 110 with the broadcast signal having immediacy information that has been read to playback the broadcast signal having immediacy information. At this time, the broadcast signal having immediacy information is played back with a time shift of only a short time interval. When the end time of the immediacy information is detected by immediacy information detection means 121, playback control means 123 refers to the interruption position information that was stored in playback position memory means 124, reads the broadcast signal from the playback interruption position from broadcast signal storage unit 131, and supplies playback means 110 with the broadcast signal that has been read to resume time-shifted playback.

Another configuration in FIG. 4 is similar to the configuration described in FIG. 1.

Figure 5:
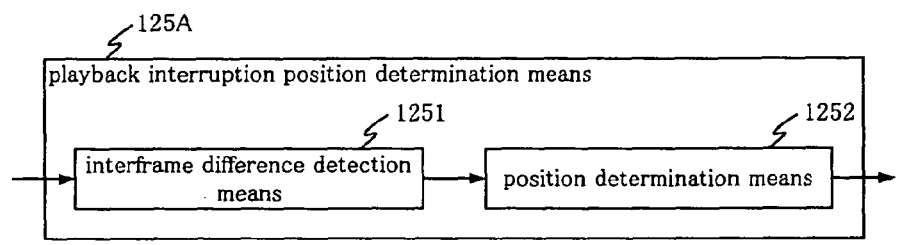
FIG. 5 is a block diagram showing the specific configuration of a playback interruption position determination means of the second embodiment.

FIG. 5 is a block diagram showing a specific configuration of the playback interruption position determination means of the second embodiment. As shown in FIG. 5, playback interruption position determination means 125A includes interframe difference detection means 1251 and position determination means 1252.

Interframe difference detection means 1251 detects differences in characteristic amounts (such as luminance information and color information) between adjacent video frames. When the value of a frame difference detected by interframe difference detection means 1251 exceeds a specific threshold value, position determination means 1252 determines that a scene (a continuously filmed video interval) has switched and supplies this frame number as a playback interruption position.

Playback interruption position determination means 125A shown in FIG. 5 uses differences between frames to derive the switching point (point of change) of a scene, but other typical methods using, for example, soundless intervals of sound can also be applied for deriving a scene switching point of media.

Figure 6:
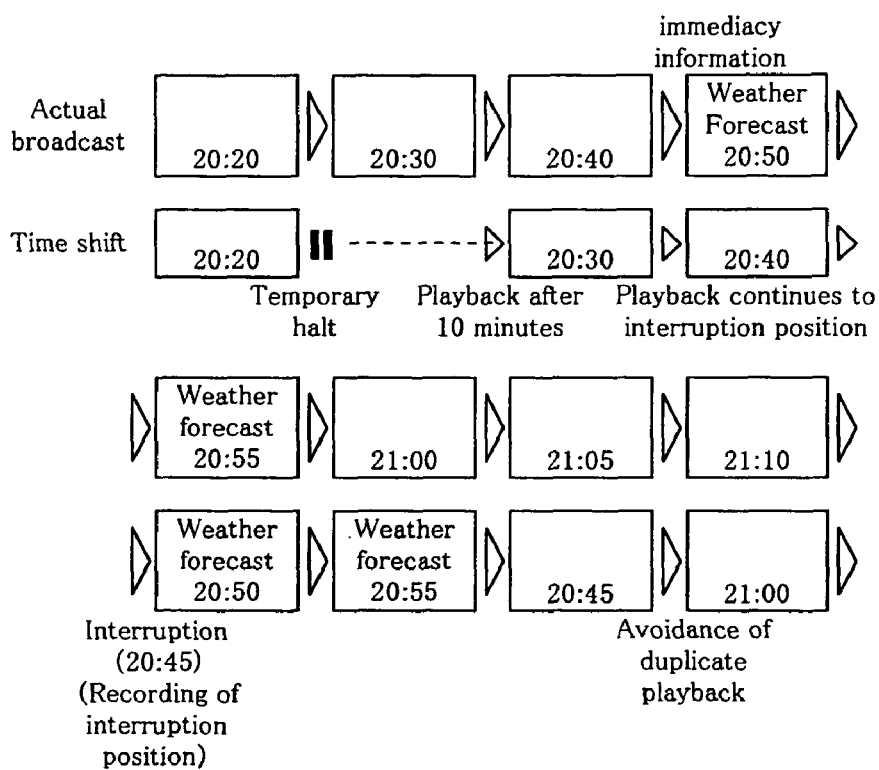
FIG. 6 is a timing chart showing an interval of playback of immediacy information of the second embodiment.
Figure 7:
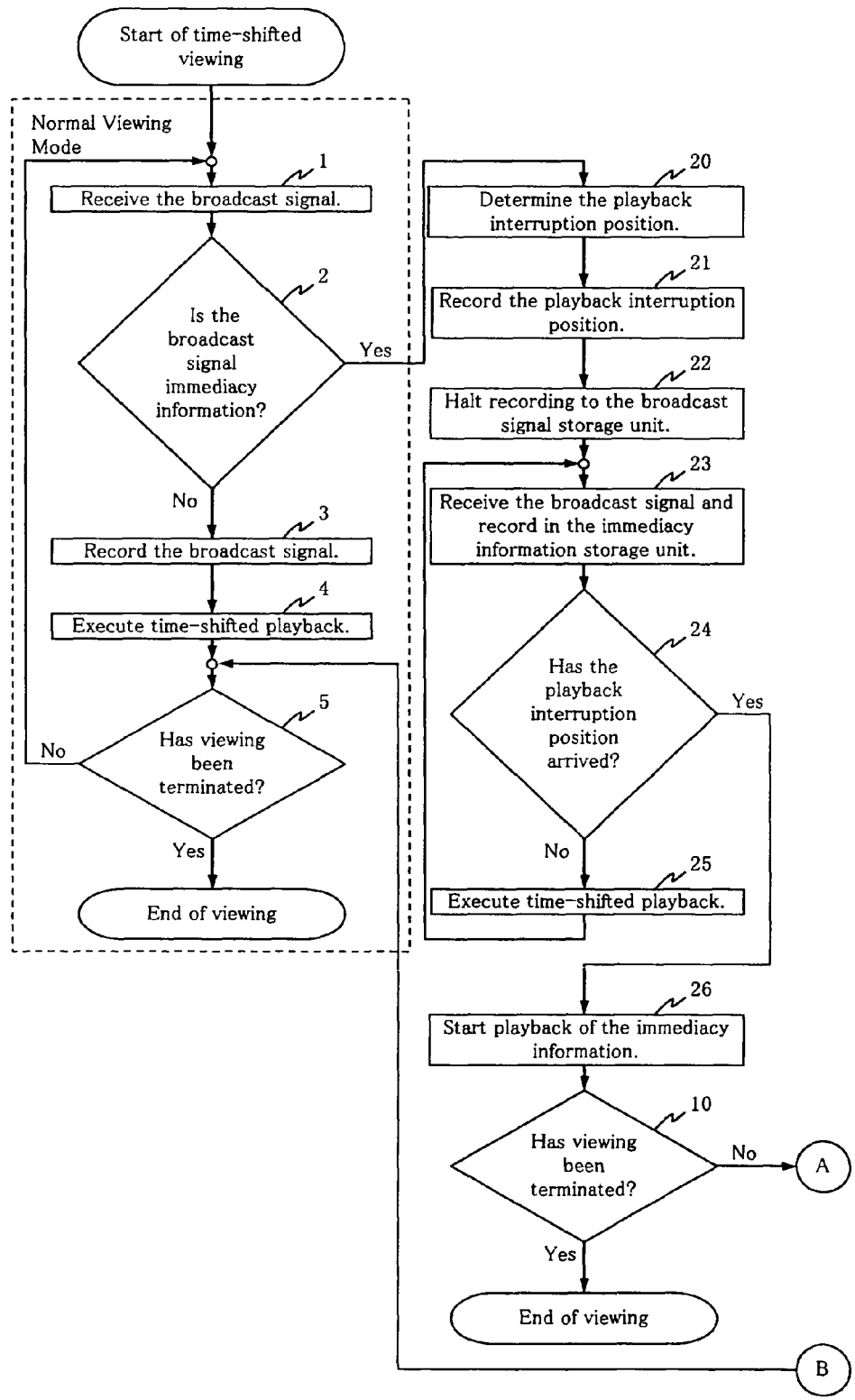
FIG. 7 is a flow chart for explaining the operation of the broadcast signal-providing device of the second embodiment.
Figure 8:
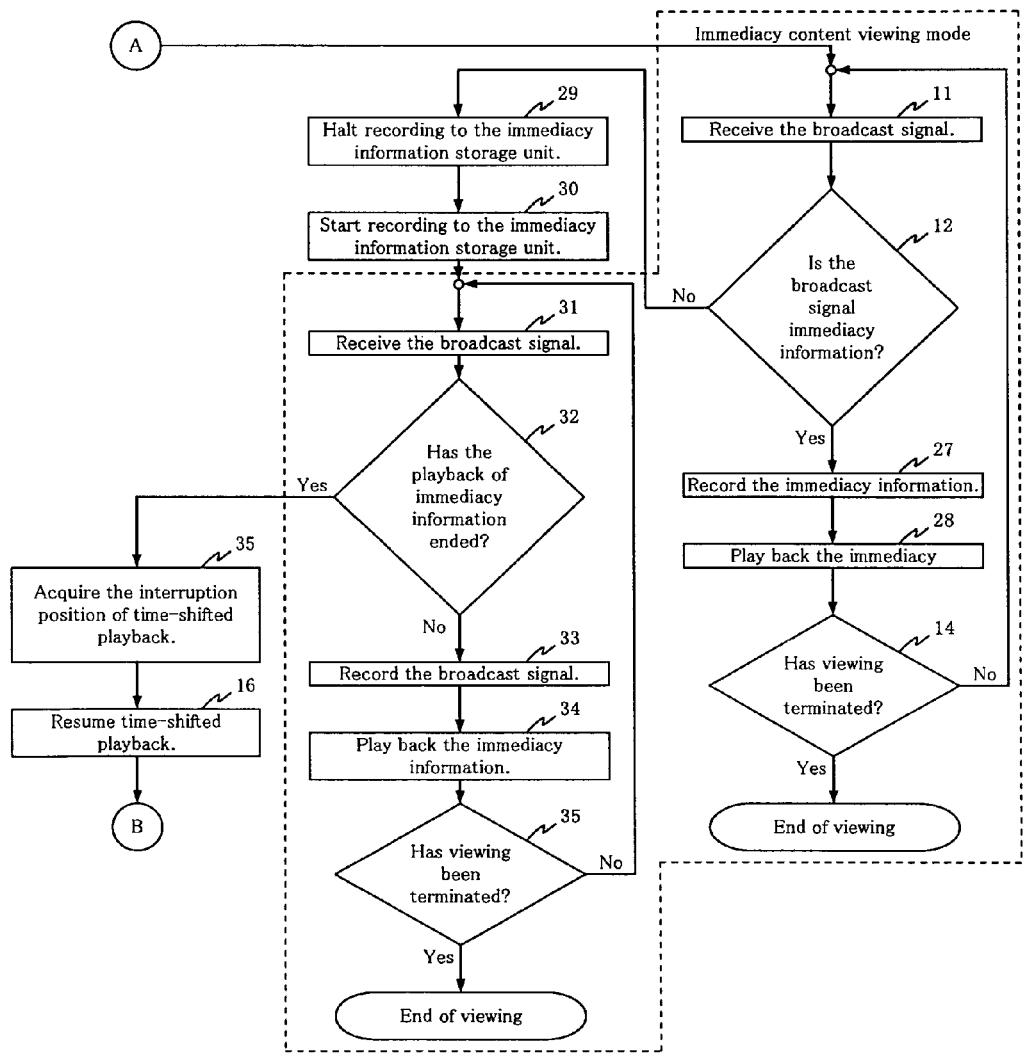
FIG. 8 is a flow chart for explaining the operation of the broadcast signal-providing device of the second embodiment.

Explanation next regards the operations of the broadcast signal-providing device in the second embodiment using FIGS. 6-8.

FIG. 6 is a timing chart showing an interval of playback of immediacy information of the second embodiment. FIGS. 7 and 8 are flow charts for explaining the operations of the broadcast signal-providing device of the second embodiment.

As shown in FIG. 6, it is assumed that the viewer begins watching a television broadcast from 20:20 (8:20 pm). It is here assumed that, at this time, the viewer begins viewing in normal viewing mode (normal time-shifted viewing mode). As shown in FIG. 6, at first, the time of playback of the content (broadcast signal) that the viewer is watching matches the time that the television broadcast is actually being carried out. The operations in the normal viewing mode of Steps 1-5 are the same as the operations previously explained in FIG. 3, and detailed explanation is therefore here omitted.

As shown in FIG. 6, when the viewer temporarily halts playback from 20:30 to 20:40, the time of playback of the content that the viewer is watching is shifted by 10 minutes from the time that the television broadcast is actually being carried out.

When the "weather report," which is immediacy information, is broadcast at 20:50, immediacy information detection means 121 detects the starting time of the immediacy information at "Yes" in Step 2. Playback interruption position determination means 125A accordingly reads the broadcast signal that is stored in broadcast signal storage unit 131 from the time that is currently being played back to the starting time of the immediacy information. Playback interruption position determination means 125A then uses differences in characteristic amounts between frames in the broadcast signal that is being read (video data) to determine in Step 20 a playback interruption position that is suitable for inserting the interval of immediacy information. For example, when the viewer is watching a television drama, a time point at which the scene switches or a time point at which a commercial starts is detected in playback interruption position determination means 125A and this time point is determined as the playback interruption position.

A plurality of points at which scenes switch may be detected, but the time point closest and toward the future from the time point currently being played back (20:40 in the example of FIG. 6) is selected as the playback interruption position. The passage of too much time from the detection of immediacy information causes a loss of the newness of the immediacy information. There is a playback interruption position at a time point 5 seconds after the time point currently being played back and at a time point 5 minutes later. In the example shown in FIG. 6, the playback interruption position is the time point 5 minutes later (the time point at which the broadcast signal that was broadcast at 20:45 is played back).

Playback interruption position determination means 125A, upon determining the playback interruption position, stores in playback position memory means 124 the interruption position information indicating this playback interruption position in Step 21.

Recording control means 122 then halts the control of recoding the received broadcast signal in broadcast signal storage unit 131 in Step 22. Playback control means 123 then executes control both to receive the broadcast signal having immediacy information and to record the broadcast signal that is being received in immediacy information storage unit 132. Playback control means 123 further refers to the interruption position information stored in playback position memory means 124 to determine in Step 24 whether the time that is currently being played back is a playback interruption position or not. If not a playback interruption position, playback control means 123 reads the broadcast signal that does not have immediacy information from broadcast signal storage unit 131 and supplies playback means 110 with the broadcast signal that has been read to continue time-shifted playback in Step 25. Playback control means 123 then repeatedly executes the processes of Steps 23-25 until determining that the playback interruption position has arrived in Step 24.

As shown in FIG. 6, when the broadcast signal that was broadcast at 20:45 is played back at "Yes" in Step 24 (upon reaching the playback interruption position), playback control means 123 reads from immediacy information storage unit 132 the broadcast signal of the "weather report" that has the immediacy information broadcast from 20:50 and supplies the broadcast signal that has been read to playback means 110 in Step 26 to begin the time-shifted playback of the broadcast signal having immediacy information. At this time, the broadcast that is actually being carried out is the broadcast of 20:55. In other words, the time of the actual broadcast diverges from the time at which the viewer watches the immediacy information by 5 minutes.

The viewing mode transitions from the normal viewing mode to the immediacy content viewing mode unless a viewing termination signal arrives from the viewer in Step 10.

Even in the immediacy content viewing mode, reception means 100 receives the broadcast signal (Step 11 of FIG. 8). Immediacy information detection means 121 constantly seeks the interval (the ending time) of the immediacy information from the broadcast signal that is being received by reception means 100. When the interval of the immediacy information is detected by immediacy information detection means 121, recording control means 122 records the broadcast signal having the immediacy information that is received by reception means 100 in immediacy information storage unit 132 in Step 27. Playback control means 123 then reads the broadcast signal having immediacy information from immediacy information storage unit 132 and supplies the broadcast signal that has been read to playback means 110 in Step 28 to execute time-shifted playback of the immediacy information. The processes of the above-described Steps 11, 12, 27, 28, and 14 are repeatedly executed unless a viewing termination signal arrives from the viewer in Step 14.

As shown in FIG. 6, the "weather report" that is the immediacy information ends at 21:00. In this case, immediacy information detection means 121 detects the ending time of the immediacy information at "No" in Step 12, whereby recording control means 122 halts the control of recording the received broadcast signal in immediacy information storage unit 132 in Step 29. Recording control means 122 then starts control for recording the received broadcast signal in broadcast signal storage unit 131 in Step 30.

As shown in FIG. 6, playback of the "weather report" that is the immediacy information has not ended at this time point. Accordingly, playback of the broadcast signal that has immediacy information must continue in immediacy content viewing mode until the playback of the broadcast signal having the immediacy information has ended. Reception means 100 receives broadcast signal that does not have immediacy information in Step 31 and playback control means 123 determines whether the playback of the broadcast signal having immediacy information has ended or not in Step 32. The determination of whether playback of the broadcast signal having immediacy information has ended or not can be realized by determining whether the broadcast signal having immediacy information that is recorded in immediacy information storage unit 132 has all been played back or not. When it is determined that the playback of broadcast signal having immediacy information has not ended, recording control means 122 in Step 33 records in broadcast signal storage unit 131 the broadcast signal that does not have immediacy information that has been received by reception means 100. Playback control means 123 then reads the broadcast signal having immediacy information from immediacy information storage unit 132 and supplies the broadcast signal that has been read to playback means 110 in Step 34 to execute time-shifted playback of the immediacy information. The processes of the above-described Steps 31-35 are repeatedly executed unless a viewing termination signal arrives from the viewer in Step 35.

When it is determined by playback control means 123 that the playback of the broadcast signal having immediacy information has ended (i.e., that all of the broadcast signal having immediacy information has been played back) in "Yes" in Step 32, playback control means 123 reads and acquires the interruption position information stored in playback position memory means 124 in Step 15. Playback control means 123 refers to the acquired interruption position information, reads the broadcast signal from the playback interruption position from broadcast signal storage unit 131, and supplies the broadcast signal that has been read to playback means 110 in Step 16 to resume time-shifted playback. The viewing mode subsequently transitions from the immediacy content viewing mode to the normal viewing mode and the processes of Steps 1-5 are again repeatedly executed. In addition, control may be implemented such that the processes of Steps 15 and 16 are executed and such that the viewing mode transitions to the normal viewing mode not only when the playback of the broadcast signal having immediacy information ends in Step 31, but also when the viewer carries out an operation to switch from the immediacy content viewing mode to the normal viewing mode.

Upon transitioning to normal viewing mode, execution is resumed for reception of a broadcast signal in Step 1, detection of immediacy information in Step 2, recording of the broadcast signal in Step 3, and time-shifted playback in Step 4, as previously described. Time-shifted playback is realized by reading the broadcast signal recorded in broadcast signal storage unit 131 and supplying it to playback means 110, but the broadcast signal (immediacy information) is not recorded in broadcast signal storage unit 131 in the interval of the immediacy information (the interval of executing the immediacy content viewing mode) as in Steps 22 and 23. As a result, although the broadcast signal from 20:45 to 20:50 is subjected to time-shifted playback as shown in FIG. 6, upon playing back to 20:50, playback jumps (skips) to the broadcast signal of 21:00. In this way, the interval of immediacy information is jumped to avoid duplicated playback of immediacy information.

As described hereinabove, the second embodiment both exhibits the effects previously described in the first embodiment and can provide immediacy information as quickly as possible without greatly impairing the viewing ambiance due to the configuration whereby, instead of an immediate transition to operations for playing back immediacy information (immediacy content viewing mode) at the time that the immediacy information is detected, time-shifted playback is continued until a point of change of the broadcast occurs (such as a time point at which a scene is switched) and transition is then made to operations for playing back the immediacy information at the time point of the point of change. For example, viewing ambiance is greatly impaired when the playback of immediacy information suddenly starts at, for example, the point of a climax of a program. The playback of immediacy information is therefore carried out at a time point that is a point of change such as the switching of a scene, and the likelihood that the climax of a program has ended is therefore high. In addition, since it can be expected that there will not be a lengthy wait until a point of change such as the switching of scenes occurs, the newness of the immediacy information will not be lost.

In the second embodiment described hereinabove, recording control means 122 is of a configuration for halting the recording of the broadcast signal to broadcast signal storage unit 131 when immediacy information is detected by immediacy information detection means 121, but a configuration is also possible in which the broadcast signal is recorded to broadcast signal storage unit 131 even when immediacy information has been detected. This configuration can also achieve the effect of providing immediacy information to the viewer without a loss of newness of content having a high level of immediacy.

In the second embodiment described above, the passage of a long time interval from the time of detecting immediacy information until the time that the point of change of the broadcast has been reached causes a loss of the newness of the immediacy information, and as a result, a configuration is also possible in which a timer is started when immediacy information is detected and the time measured, and when it is determined that a prescribed time interval has passed, the transition to the immediacy content viewing mode is implemented whether a point of change has been reached or not.

Third Embodiment

In the above-described second embodiment, upon detection of immediacy information, a point of change of the normal broadcast such as a switching of scenes was detected, this point of change was determined as an interruption position, and the time-shifted playback continued until the interruption position, but immediacy information varies according to the level of immediacy and, depending on the level of immediacy, some information should be quickly provided to the viewer but some information does not need to be immediately provided to the viewer. This third embodiment is of a configuration such that the time that immediacy information is provided changes according to the level of immediacy.

Figure 9:
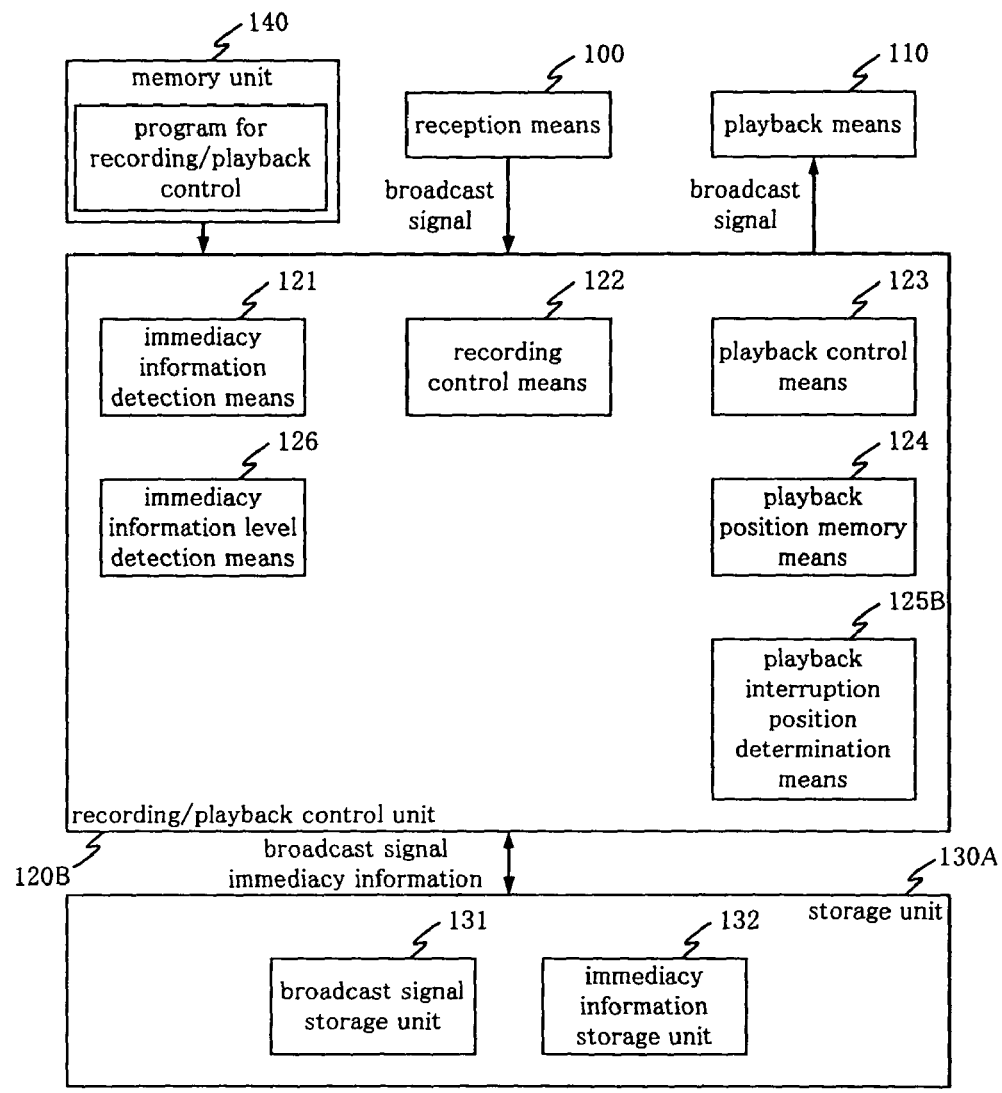
FIG. 9 is a block diagram showing the configuration of the broadcast signal-providing device of the third embodiment.

FIG. 9 is a block diagram showing the configuration of the broadcast signal-providing device of the third embodiment. In the configuration shown in FIG. 9, in contrast to the configuration shown in FIGS. 1 and 4, playback interruption position determination means 125B and immediacy information level detection means 126 are provided in recording/playback control unit 120B.

Immediacy information level detection means 126 detects the immediacy level of immediacy information that has been detected by immediacy information detection means 121. For example, immediacy levels are established in advance according to the type of immediacy information, such as level 1 (high level) when the immediacy information is information regarding an earthquake or tsunami, level 2 (intermediate level) when the immediacy information is traffic congestion information, and level 3 (low level) when the immediacy information is a weather report, and the level of detected immediacy information is then detected.

When the interval of immediacy information has been detected by immediacy information detection means 121, playback interruption position determination means 125B analyzes the broadcast signal that is recorded in broadcast signal storage unit 131 (video data or sound data (audio data), or both video data and sound data). Playback interruption position determination means 125B then determines the interruption position of playback that is suitable for the insertion of the interval of immediacy information (the interruption position of playback that is suitable for switching from the normal viewing mode to the immediacy content viewing mode) according to the results of analyzing the broadcast signal and the immediacy level detected by immediacy information level detection means 126. Playback interruption position determination means 125B then stores in playback position memory means 124 interruption position information indicating the playback interruption position that has been determined.

The configuration in FIG. 9 is otherwise the same as the configuration described in FIGS. 1 and 4.

Figure 10:
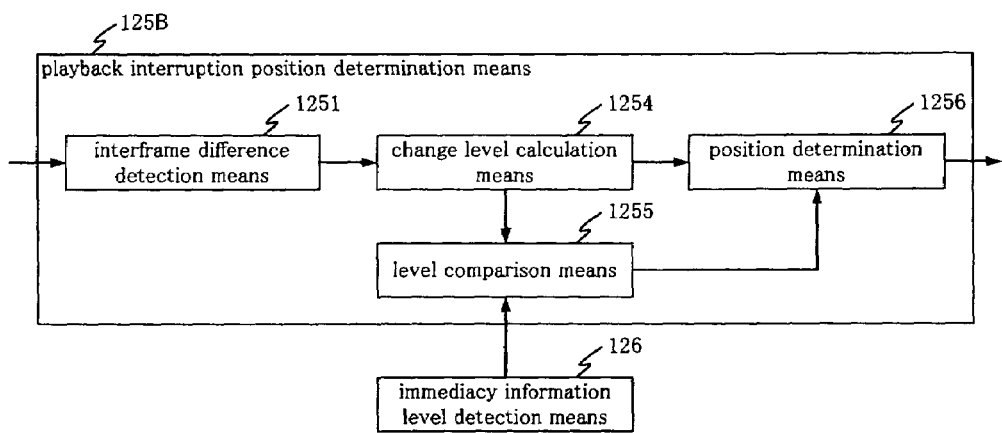
FIG. 10 is a block diagram showing the specific configuration of the playback interruption position determination means of the third embodiment.

FIG. 10 is a block diagram showing a specific configuration of the playback interruption position information determination means of the third embodiment. As shown in FIG. 10, playback interruption position determination means 125B includes interframe difference detection means 1251, change level calculation means 1254, level comparison means 1255, and position determination means 1256.

Interframe difference detection means 1251 detects differences in characteristic amounts (such as luminance information and color information) between adjacent video frames, as in the configuration described in FIG. 5. Change level calculation means 1254 calculates the level of change of images (a level that indicates whether a scene has changed greatly or changed slightly) according to the values of frame differences when the value of frame differences detected by interframe difference detection means 1251 exceeds a specific threshold value. Level comparison means 1255 compares the level of change that has been found by change level calculation means 1254 with an immediacy level detected by immediacy information level detection means 126 and determines whether the level of change exceeds a prescribed threshold value that accords with immediacy levels. Based on the determination result that the prescribed threshold value from level comparison means 1255 has been exceeded, position determination means 1256 determines that a position is to be the interruption position of playback that is suitable for the insertion of an interval of immediacy information and supplies the frame number of this position as the playback interruption position.

Playback interruption position determination means 125B shown in FIG. 10 uses differences between frames to derive the point at which scenes are switched (the point of change), but other typical methods can also be applied for deriving the points at which media scenes are switched by using, for example, silent audio intervals.

Figure 11:
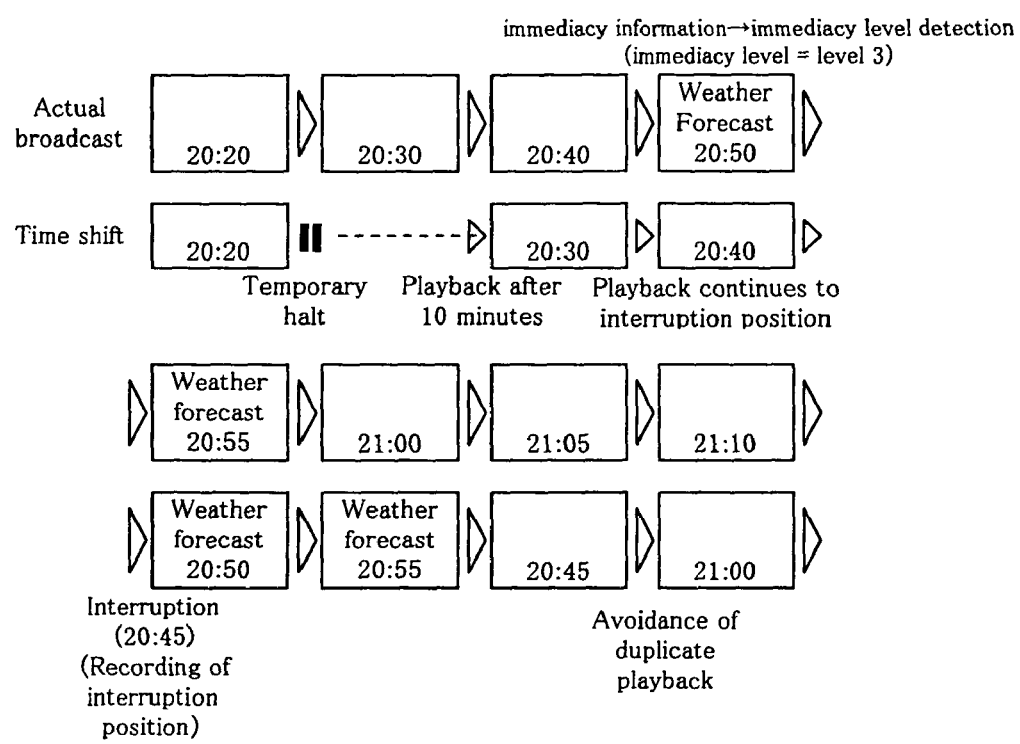
FIG. 11 is a timing chart showing an interval of playback of immediacy information of the third embodiment.
Figure 12:
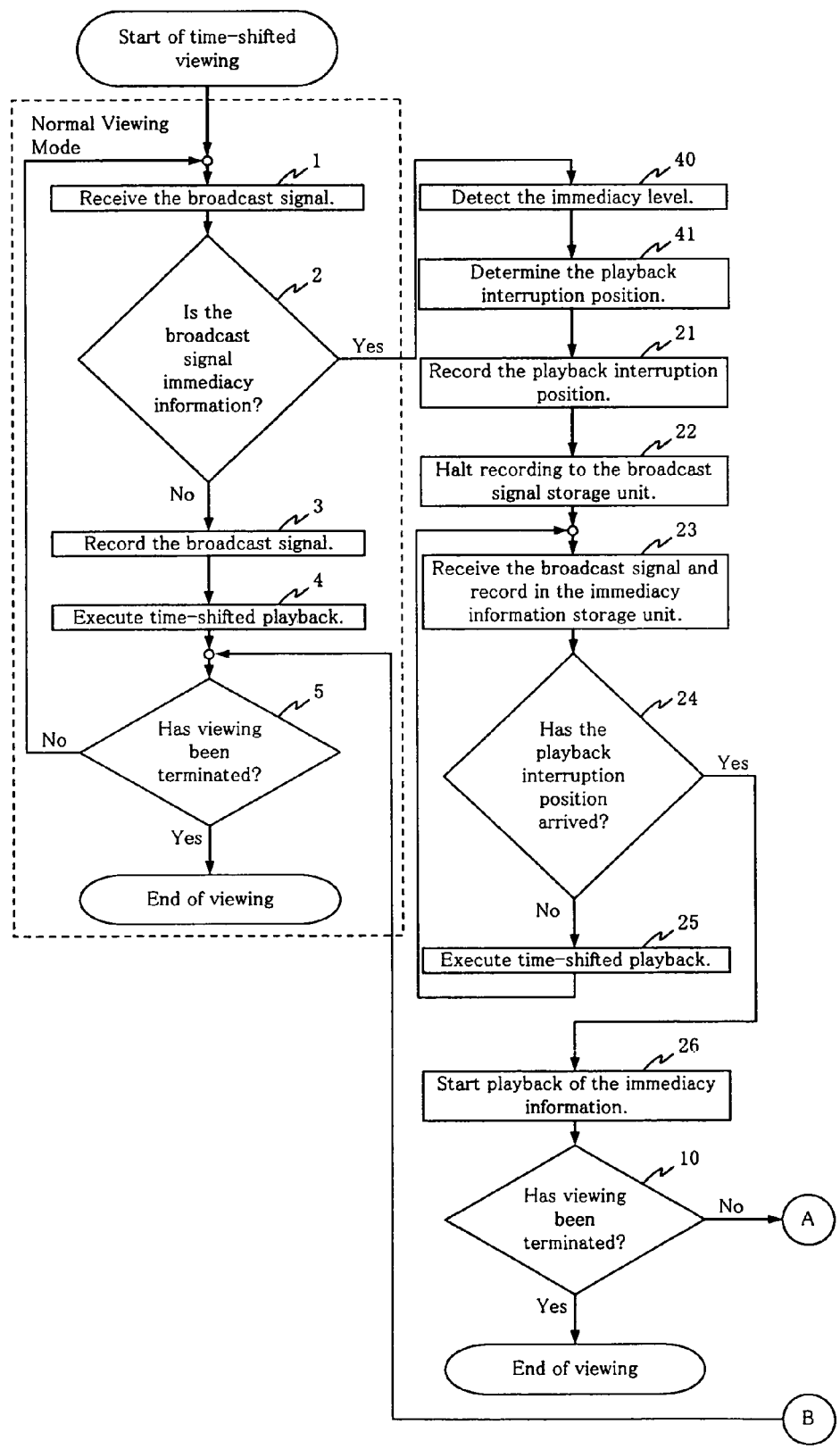
FIG. 12 is a flow chart for explaining the operation of the broadcast signal-providing device of the third embodiment.

Explanation next regards the operations of the broadcast signal-providing device in the third embodiment with reference to FIGS. 11 and 12.

FIG. 11 is a timing chart showing an interval of playback of immediacy information in this third embodiment, and FIG. 12 is a flow chart for explaining the operations of the broadcast signal-providing device of the third embodiment.

As shown in FIG. 11, it is assumed that the viewer starts watching a television broadcast from 20:20 (8:20 pm). It will be assumed that, at this time, the viewer begins watching in normal viewing mode (a normal time-shifted viewing mode). As shown in FIG. 11, the time of playback of the content (broadcast signal) that the viewer is watching matches the time at which the television broadcast is actually being carried out. In addition, the operations in the normal viewing mode in Steps 1-5 are the same as the operations previously described in FIG. 3 and detailed explanation is therefore here omitted.

As shown in FIG. 11, when the viewer temporarily halts playback from 20:30 to 20:40, the time of playback of the content that the viewer is watching shifts by ten minutes from the time at which the television broadcast is actually being carried out.

When a "weather report," which is immediacy information, is broadcast at 20:50, immediacy information detection means 121 detects the starting time of this immediacy information at "Yes" in Step 2. Accordingly, immediacy information level detection means 126 detects the immediacy level of the immediacy information in Step 40. Playback interruption position determination means 125B then reads the broadcast signal from the time that is currently being played back until the starting time of the immediacy information and, based on the immediacy level that is detected by immediacy information level detection means 126 and the image analysis results of the broadcast signal that has been read, determines the playback interruption position of playback in Step 41. For example, playback interruption position determination means 125B determines a point of change in which the level of change is small (a time point at which the scene changes only slightly) as the interruption position when the immediacy level is level 1 (high level), determines a point of change in which the level of change is an intermediate degree (a time point at which the scene undergoes a rather large change) as the interruption position when the immediacy level is level 2 (intermediate level), and determines a point of change in which the level of change is great (a time point at which there is a large scene switch such as at the start of a commercial) as the interruption position when the immediacy level is level 3 (low level). In the example shown in FIG. 11, the immediacy information is a "weather report" for which the immediacy level is level 3, and a point of change having a high level of change is therefore determined as the interruption position.

When a plurality of scene switches are detected, as the playback interruption position, the time 20:45 is determined as the interruption position in the example shown in FIG. 11. When the immediacy level is level 1, a configuration may be adopted in which the time-shifted playback is immediately interrupted to transition to the immediacy content viewing mode as in the first embodiment.

Upon determining the playback interruption position, playback interruption position determination means 125A stores the interruption position information indicating this playback interruption position in playback position memory means 124 in Step 21. Subsequent processes are the same as the processes of Steps 22-26 and 10 shown in FIG. 7, and redundant explanation is therefore here omitted. In addition, the processes following the transition to the immediacy content viewing mode are also the same as the processes of Steps 11, 12, 27, 28, 14, and 29-35 shown in FIG. 8, and redundant example is therefore here omitted.

As described in the foregoing explanation, the third embodiment exhibits the effects described in the first and second embodiments, and further, due to a configuration for adjusting the interruption position of playback that is appropriate to the immediacy level of immediacy information, can quickly provide the viewer with information that should be provided quickly, can provide the viewer with information that need not be provided as quickly after the passage of a prescribed time interval, and therefore can simultaneously provide the viewer with immediacy information without any loss of the newness while at the same time preventing interference with the viewing ambiance.

In the third embodiment as described above, recording control means 122 is of a configuration for halting the recording of the broadcast signal to broadcast signal storage unit 131 when immediacy information has been detected by immediacy information detection means 121, but may also be of a configuration for recording the broadcast signal in broadcast signal storage unit 131 even when immediacy information has been detected. Even with this configuration, the effect of enabling provision of content having a high immediacy level without loss of newness can be attained.

In the third embodiment as described above, when the immediacy level is low, a long time interval from the time point of detecting immediacy information until the point of change of the broadcast is reached can cause a loss of the newness of the immediacy information, and a configuration may therefore be adopted whereby a timer is started and the time interval is measured upon detection of immediacy information and the transition to the immediacy content viewing mode is then brought about when the passage of a prescribed time interval has been determined even if a point of change has not been reached.

In the second and third embodiments as described hereinabove, a configuration is adopted whereby, when immediacy information has been detected, the broadcast signal, from the time point that is currently being played back, until the starting time of the immediacy information, is read and the broadcast signal (video signal) that has been read is then analyzed to determine an interruption position. However, the present invention is not limited to this type of configuration and may be of a configuration in which the broadcast signal that is being played back with a time shift is analyzed in order to detect a point of change (a scene-switching point) and this point of change is then determined as the interruption position.

When immediacy information is inserted midway while a broadcast signal transmitter that is installed in a broadcast station is transmitting a broadcast signal (content), a configuration may be adopted for transmitting with an immediacy information identification signal that indicates that immediacy information is being transmitted superposed on the broadcast signal. For example, immediacy information having identification information may be contained in the broadcast signal as meta-information that defines frame attributes. This configuration enables easy detection of the transmission of immediacy information in (immediacy information detection means 121 of) the broadcast signal-providing device that is installed on the viewer side. Still further, a configuration may be adopted whereby a broadcast signal transmitter installed in the broadcast station, when transmitting a broadcast signal, superposes point-of-change identification information that indicates the switching of scenes on the broadcast signal when transmitting. For example, point-of-change identification information may be included in the broadcast signal as meta-information for defining frame attributes. This configuration enables the easy detection of a point of change (scene-switching) in (playback interruption position determination means 125A and 125B of) the broadcast signal-providing device that is installed on the viewer side. Finally, a broadcast signal-providing system is comprised of the above-described broadcast signal transmitter and broadcast signal-providing device (also referred to as "broadcast signal reception device").

What is claimed is:

1. A broadcast signal-providing device provided with reception means for receiving a broadcast signal, recording control means for recording to a storage unit the broadcast signal that is received by the reception means, and playback control means for, after a prescribed dine interval, implementing time-shifted playback of the broadcast signal that is recorded in said storage unit; wherein:

said broadcast signal-providing device is provided with an immediacy information detection means for, during time-shifted playback of a broadcast signal, determining whether content of the broadcast signal being received includes information, of high immediacy or not and detecting a content interval having information of high immediacy; and said playback control means, when the content interval having said information of high immediacy is detected by said immediacy information detection means, changes the order of providing the content interval having said information of high immediacy.

2. The broadcast signal-providing device according to claim 1, wherein said broadcast signal is a signal of a normal broadcast.

3. The broadcast signal-providing device according to claim 1, wherein, regarding a content interval having said information of high immediacy, this interval is not played back again during time-shifted playback for playing back after a prescribed time interval.

4. The broadcast signal-providing device according to claim 1, further provided with an interruption position determination means for, when a broadcast signal having immediacy information is detected by the immediacy information detection means, detecting a point of change having the broadcast signal that is being played back and determining the detected point of change as the interruption position of playback.

5. The broadcast signal-providing device according to claim 4, further provided with an immediacy level detection means for, when a broadcast signal having immediacy information is detected by the immediacy information detection means, detecting the level of immediacy in the immediacy information; wherein the interruption position determination means detects a point of change of a broadcast signal according to the level detected by said immediacy level detection means and determines the detected point of change as the interruption position of playback.

6. The broadcast signal-providing device according to claim 4, wherein the interruption position determination means detects a point of change based on the value, of differences in characteristic amounts between frames that make up a broadcast signal.

7. The broadcast signal-providing device according to claim 1, wherein the immediacy information detection means uses meta-information contained in a broadcast signal to detect immediacy information.

8. The broadcast signal-providing device according to claim 1, wherein the immediacy information detection means detects immediacy information by image analysis or audio analysis of a broadcast signal.

9. A broadcast signal-providing method of recording a broadcast signal received by means of a reception means to a storage unit and, after a prescribed time interval, executing time-shifted playback of the broadcast signal recorded in the storage unit, wherein: during time-shifted playback of the broadcast signal, determination is made whether content of a broadcast signal being received includes information of high immediacy or not, whether a content interval having information of high immediacy is detected, and when a content interval having said information of high immediacy is detected, whether the order of providing the content interval having said information of high immediacy is changed.

10. The broadcast signal-providing method according to claim 9, wherein said broadcast signal is a signal of a normal broadcast.

11. The broadcast signal-providing method according to claim 9, wherein, regarding a content interval having said information of high immediacy, this interval is not played back again during time-shifted playback for playing back after a prescribed time interval.

12. The broadcast signal-providing method according to claim 10, wherein, when a broadcast signal having immediacy information is detected, a point of change of the broadcast signal that is being played back is detected, and the detected point of change is determined as the interruption position of playback.

13. The broadcast signal providing method according to claim 12, wherein, when a broadcast signal having immediacy information is detected, the level of immediacy in the immediacy information is detected, the point of change of the broadcast signal is detected according to the detected level, and the detected point of change is determined as the interruption position of playback.

14. The broadcast signal-providing method according to claim 12, wherein a point of change is detected based on values of differences of characteristic amounts between frames that make up a broadcast signal.

15. A recording medium for recording a broadcast signal-providing program for causing a computer to execute time-shifted playback of a broadcast signal, said broadcast signal-providing program causing a computer to execute:
an immediacy information detection process of, during time-shifted playback of a broadcast signal, determining whether content of a broadcast signal that is being received includes information of high immediacy or not, and detecting a content interval having information of high immediacy; and
a playback control process of when a content interval having information of high immediacy is detected by said immediacy information detection process, changing the order of providing the content interval having said information of high immediacy.

16. The recording medium for recording the broadcast signal-provided program according to claim 15, wherein, during time-shifted playback of a signal of a normal broadcast, a computer is caused to execute an immediacy information detection process or detecting a content interval having information of high immediacy in the signal of a normal broadcast that is received.

17. A broadcast signal-providing system that is provided with a broadcast signal transmitter for transmitting a broadcast signal and a broadcast signal-providing device for receiving the broadcast signal transmitted from the broadcast signal transmitter to provide to a viewer, wherein:
said broadcast signal transmitter transmits a broadcast signal that includes information indicating attributes of the broadcast signal; and
said broadcast signal-providing device includes;
a reception means for receiving a broadcast signal;
a recording control means for recording to a storage unit a broadcast signal received by said reception means;
an immediacy information detection means for, during time-shifted playback of a broadcast signal, determining whether content of the broadcast signal being received includes information of high immediacy or not and, based on the information indicating attributes of the broadcast signal, detecting a content interval having information of high immediacy; and
a playback control means for both executing time-shifted playback after a prescribed time interval of a broadcast signal that is recorded in said storage unit and, when a content interval having said information of high immediacy is detected by said immediacy information detection means, changing the order of providing the content interval having said information of high immediacy.

18. The broadcast signal-providing device according to claim 2, wherein, regarding a content interval having said information of high immediacy, this interval is not played back again during time-shifted playback for playing back after a prescribed time interval.

19. The broadcast signal-providing device according to claim 2, further provided with an interruption position determination means for, when a broadcast signal having immediacy information is detected by the immediacy information detection means, detecting a point of change having the broadcast signal that is being played back and determining the detected point of change as the interruption position of playback.

20. The broadcast signal-providing method according to claim 10, wherein, regarding a content interval having said information of high immediacy, this interval is not played back again during time-shifted playback for playing back after a prescribed time interval.

* * * * *